Nov. 2, 1943.  H. F. SCHIPPEL  2,333,447
LANDING WHEEL FOR AIRCRAFT
Filed Feb. 4, 1942  2 Sheets-Sheet 1
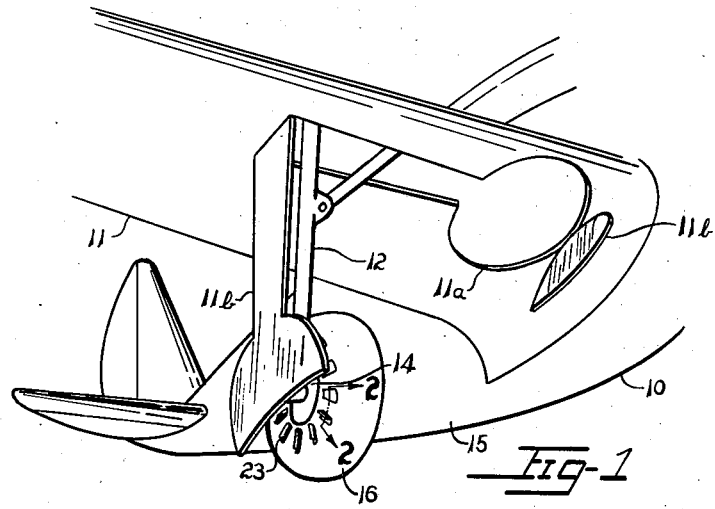
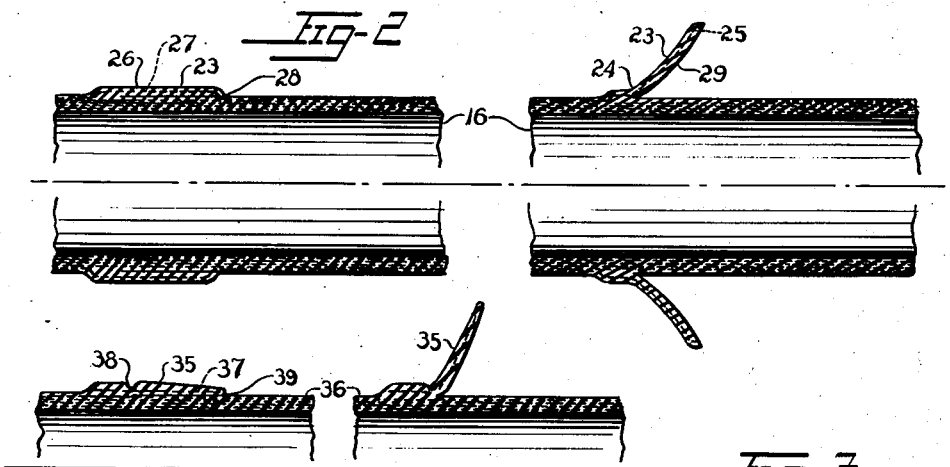
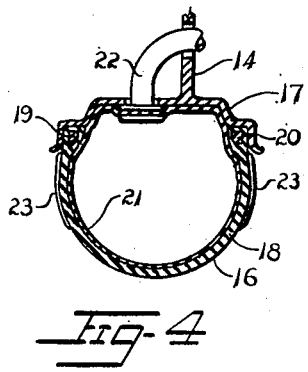
Inventor
Henry F. Schippel
By Willis F. Avery
Att'y Nov. 2, 1943.  H. F. SCHIPPEL  2,333,447
LANDING WHEEL FOR AIRCRAFT
Filed Feb. 4, 1942   2 Sheets-Sheet 2

Inventor
Henry F. Schippel
By Willis F. Avery
Atty

Patented Nov. 2, 1943

2,333,447

UNITED STATES PATENT OFFICE 2,333,447

LANDING WHEEL FOR AIRCRAFT

Henry F. Schippel, Akron, Ohio, assignor to The B. F. Goodrich Company, New York, N. Y., a corporation of New York Application February 4, 1942, Serial No. 429,560

13 Claims. (Cl. 154—14)

This invention relates to landing wheels and tires for aircraft, and especially to avoiding excessive tread wear on landing.

Objects of the invention are to provide pre-rotation of the wheel before landing without excessive drag of the aircraft, to reduce undesirable wind resistance at the top of the wheel, to provide strength and durability of structure with minimum weight thereof, and to provide for convenience of manufacture.

A further object is to provide for attaining a high speed of pre-rotation such that the difference between the peripheral speed of the tire and the relative ground speed will be lessened or eliminated and scraping of tire on landing will be minimized, a result for which prior expedients have not been fully satisfactory.

A more specific object is to provide these results substantially without increasing space requirements of the tire and wheel, this being important especially in the case of retraction of the landing gear into space within the aircraft.

These and other objects will appear from the following description and the accompanying drawings.

Of the drawings,

Fig. 1 is a perspective view of an aircraft landing gear showing a landing wheel constructed in accordance with and embodying the invention.

Fig. 2 is a section of the tire of Fig. 1, taken on line 2—2 of Fig. 1, parts being broken away, and the inner tube being removed.

Fig. 3 is a view like Fig. 2 showing a modified construction.

Fig. 4 is a cross-sectional view of the wheel and tire.

Figure 5:
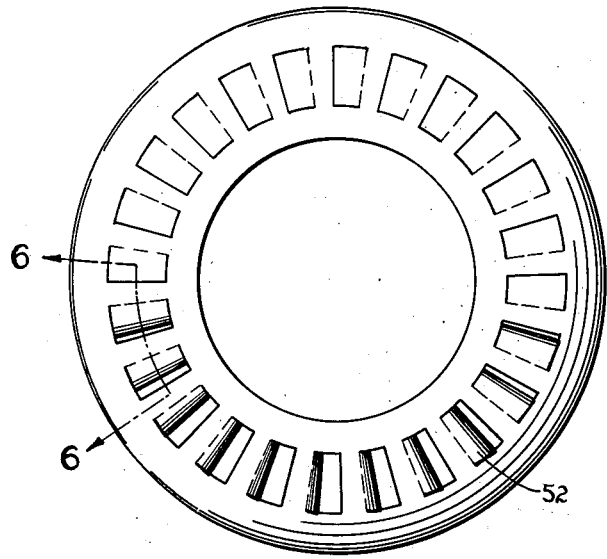
Fig. 5 is a side elevation of a tire showing a further modified construction.

In accordance with the invention, a wheel of the aircraft is provided with a series of vanes or sails which normally lay parallel to the surface of rotation, or substantially so, but are deflected away from such surface when opposed to the air flow so as to stand in the air flow and cause pre-rotation of the wheel. In one form the invention contemplates vanes formed integrally with the sidewall of the tire. Convenient procedure is provided for incorporating the vanes in the tire during the building thereof.

Referring to the drawings, Fig. 1 shows the under side of an airplane 10 having a wing 11 and a retractable landing gear 12 adapted to be folded into and concealed within a well 11a in the wing. A closure 11b, 11b closes the well in flight. A wheel 14 is rotatably mounted on the landing gear with its axis generally cross-wise of the fuselage 15. An inflatable pneumatic tire 16 is mounted on the wheel for contact with the ground in landing the plane. As shown in Fig. 4, the wheel 14 is provided with a channel rim 17 and the tire 16 comprises an outer casing 18 having bead portions 19, 20 engaging the rim channel, and an inner tube 21 therewithin having a valve tube 22 extending through the rim.

When the tire is not rotating at the instant of contact in landing it is locally abraded before it attains a peripheral speed comparable to the ground speed of the plane. The greater the reduction in the difference between these speeds at the time of ground contact, the less the wear of the tire tread, and it follows that it is desirable to lessen the air resistance of the vanes themselves, as well as the resistance of the bearings, as much as possible.

For attaining the objects of the invention, the tire is provided around its sides with a plurality of vanes in the form of flaps 23 each hinged to the tire casing along a radial margin, as at 24 and normally lying along the sidewall of the tire parallel thereto. The vanes are of resilient rubber and are preferably reinforced by at least one layer 25 of textile material extending into the body of the tire casing so that the vanes are integral with the tire and supply the hinging action by the flexibility of the material.

The vanes 23 are arranged with their free margins extending in the same circumferential direction, so as to extend forwardly of the aircraft at the bottom of the wheel and rearwardly thereof at the top of the wheel, the arrangement being such that when the wheel is lowered for landing during flight, so that the tire is moved into the air flow, the vanes 23 will be deflected outwardly by the force of the air on the lower side of the tire, as shown at the right in Fig. 2, and will present such resistance to the air flow as to rotate the wheel about its axis. The vanes each return to a position against the wheel as at the left of Fig. 2 as they spill off the air flow and approach the top of the wheel by virtue of the resilience of the material at the hinge, assisted by the force of the air, so as to present minimum resistance to the rotation of the wheel. When the wheel is retracted, so that the tire is withdrawn from the air flow, the vanes all lay along the side of the tire, thereby keeping the width of the tire to a minimum so that space requirements are not increased.

As shown in Fig. 2, in one form of the invention, the vanes 23 are formed by molding circumferentially spaced-apart projections 26 on the side of the tire as the tire is molded from rubber and fabric or cord with an outer ply of fabric or cords 27 extending along the side of the tire and offset at each projection so as to lay well within the projection, and then partially separating the projections from the tire by a cut 28 extending parallel to the side of the tire and beneath the offset layer of fabric or cords. The offset portion of fabric or cords at the hinge line is left uncut to provide strength where the greatest shear load occurs under the flexure, while the rubber material 29 under the fabric protects the fabric reinforcement from the weather.

In the form of the invention shown in Fig. 3, circumferentially spaced-apart projections 35 are formed on the side of the tire casing 36 as in the form shown in Fig. 2. The fabric reinforcements 37, however, lay wholly within the projections and do not extend therebeyond. Also the projections are formed with radial grooves 38 extending partially therethrough near one end of each projection to facilitate hinging of the vane. The vane is provided by cutting through the rubber material of the projection parallel to the sidewall of the tire as at 39 from the end farthest from the groove 38 to a position near the groove.

Figure 6:
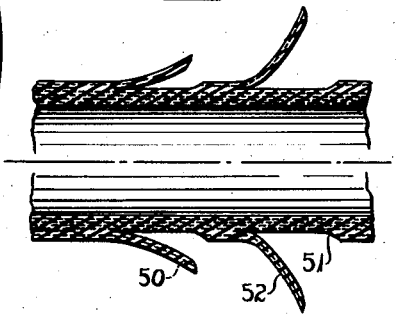
Fig. 6 is a section thereof, taken on line 6—6 of Fig. 5.

In the form of the invention illustrated in Figs. 5 and 6, the sides of the tire casing, as molded, are free from any projections. An additional strip 50 of fabric is embedded in the rubber sidewall of the tire, extending circumferentially thereof and spaced from the other textile material of the tire by a layer 51 of rubber material. At intervals around the side of the tire, vanes 52 are carved into the sidewall of the tire by cutting through the sidewall to a position just under the fabric layer 50, three incisions being made for each vane, two circumferentially of the tire and one radially thereof, the incisions intersecting at their ends at generally right angles to each other. The material inclosed between the incisions is then cut or peeled loose from the underlying material, the fabric 50 being included in the vane. Where the cuts are made just through the fabric, the fabric acts as a guide in determining the depth of the incisions and assists in providing a determinate surface of separation thereunder.

Figure 7:
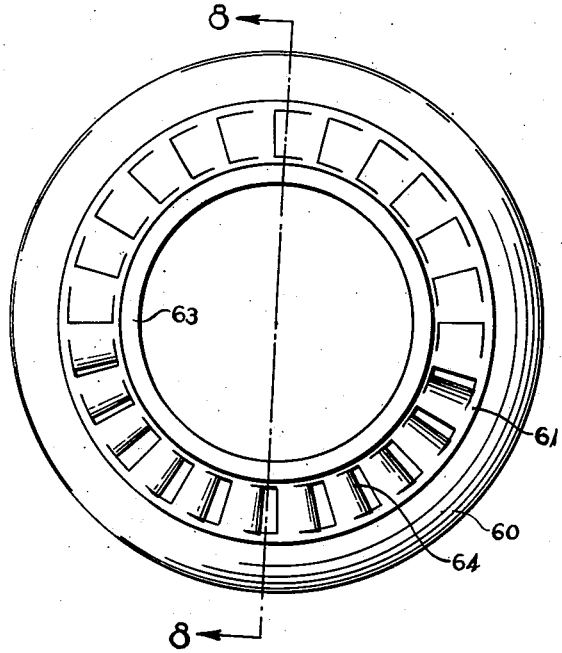
Fig. 7 is a side elevation of a still further modified construction.
Figure 8:
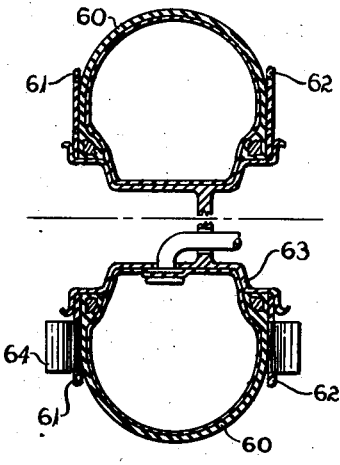
Fig. 8 is a sectional view thereof taken on line 8—8 of Fig. 7, parts being broken away.

In a further form of the invention, shown in Figs. 7 and 8, the vanes are separate from the tire casing 60, separate flat annular bands 61, 62 of rubber-like material and fabric, or similar flexible material being mounted on the rim 63 at each side of the tire and having circumferentially spaced-apart vanes 64 formed by U-shaped incisions entirely through the material and leaving one radial margin of each vane free and one radial margin attached, the free radial margins of the vanes all extending in one direction of rotation about the rings. The rings are assembled with the tire and may be adhered thereto if desired. The rings are arranged so that the free radial margins of their vanes extend forwardly of the aircraft at the bottom of the wheel.

In all the forms of the invention the resilient hinging of the vanes and their natural tendency to extend along the side of the wheel causes them to remain in that position at the top of the wheel and present the least resistance to the air flow, although the force of air suction at the sides of the wheel may start the vanes slightly outward against the resilient force of the rubber of the hinge connection, this being beneficial to facilitate the action of the air in forcing the vanes outward at the bottom of the wheel without excessively building up resistance at the upper part of the wheel. At the bottom of the wheel, when the vanes are exposed to the air flow, the vanes are picked up by the force of the air and swung away from the wheel into the air flow where they cause a high speed of pre-rotation of the wheel before the wheels contact the ground.

Variations may be made without departing from the scope of the invention as it is defined by the following claims.

I claim:

1. Means for effecting rotation of an aircraft landing wheel in the air flow of flight, said means comprising an annular body comprising resilient rubber-like material, and a series of flaps integral with said rubber-like material providing a resiliently hinged connection with said body, said flaps extending in the same circumferential direction of said body, said hinged connection extending along an edge of the flap leading with respect to the direction of rotation of the body, said flaps being free from the body along both trailing and side edges of the flaps, and said flaps by virtue of said hinged connection being capable of swinging movement between a position along said body and a position extending outwardly therefrom.

2. Means for effecting rotation of an aircraft landing wheel and tire assembly in the air flow of flight, said means comprising an annular element including resilient rubber-like material at the sidewall of the tire, said element being partly severed at circumferentially spaced-apart positions to provide flaps joined integrally to said element by said material in resiliently hinged union therewith at an edge of the flap leading with respect to the direction of rotation of the assembly and normally extending along the element and being adapted to be swung outward into the air flow, said flaps being entirely free from said element along both trailing and side edges of the flaps.

3. Means as defined in claim 2 in which said annular element consists of the tire sidewall having textile reinforcement therein, and said flaps include a portion of said reinforcement.

4. Means as defined in claim 2 in which said annular element comprises a flat element adapted to be mounted between the tire sidewall and the rim flange of the wheel with the flaps of the element disposed radially outward of the rim.

5. A tire comprising an annular body having a sidewall of textile material and rubber-like material, said sidewall being partly severed at circumferentially spaced-apart positions to provide flaps integral with said sidewall and resiliently hinged thereto by said rubber-like material and said flaps including a part of said textile material.

6. A tire as defined in claim 5 in which the textile material extends from the tire sidewall into the flaps through the hinge portions thereof.

7. A tire as defined in claim 5 in which said flaps are cut from portions of the sidewall to lie normally flush with the outer surface of the sidewall.

8. A tire as defined in claim 5 in which said sidewall has exposed protuberances and said flaps are cut from said protuberances.

9. The method of making a tire for aircraft which comprises molding a body comprising rubber-like material to form a sidewall, and partially severing a flap of material therefrom to provide a flexible vane resiliently hinged integrally with the sidewall.

10. The method of making a tire for aircraft which comprises molding a body of rubber-like material and reinforcing textile material to form a sidewall, and partially severing a flap of material therefrom in a manner to leave both rubber-like material and textile material in the flap to provide a flexible vane resiliently hinged integrally with the sidewall.

11. The method of making a tire for aircraft which comprises molding a body of rubber-like material and reinforcing textile material to form a sidewall having an integral projection thereon, and partially severing a flap of material from said projection to provide a flexible vane normally extending along the sidewall and deflectable therefrom.

12. The method of making a tire for aircraft which comprises molding a body of rubber-like material and reinforcing textile material to form a sidewall having an integral projection thereon with a part of said textile material in the projection and extending into the sidewall, and partially severing a flap of material from said projection while leaving textile material extending from the sidewall into the projection to provide a flexible vane of reinforced rubber-like material normally extending along the sidewall and deflectable therefrom.

13. Means for effecting rotation of an aircraft landing wheel in the air flow of flight, said means comprising an annular tire having a sidewall of textile material and rubber-like material, said sidewall being partly severed at circumferentially spaced-apart positions to provide flaps integral with said sidewall in hinged connection therewith, said hinged connection extending along an edge of the flap leading with respect to the direction of rotation of said tire and said flaps being free from said tire along both trailing and side edges of said flaps.

HENRY F. SCHIPPEL.